UNITED STATES PATENT OFFICE.

WALDEMAR THILMANY, OF CLEVELAND, OHIO.

IMPROVEMENT IN TANNING COMPOUNDS.

Specification forming part of Letters Patent No. 143,105, dated September 23, 1873; application filed August 19, 1873.

*To all whom it may concern:*

Be it known that I, W. THILMANY, of Cleveland, in the county of Cuyahoga and State of Ohio, have invented a certain new and Improved Tanning Compound, of which the following is a full, clear, and complete description.

The nature of my improvement relates to a compound or preparation for tanning hides and skins; and which consists of the chloride of barium, or muriate of barytes or baryta in any of its forms, in combination with tannin, sugar, or its saccharoids, combined in or about the proportions and manner as hereinafter described.

The chloride of barium may be mixed, first, with the water used for extracting the tannin (liquid) from the bark, catechu, or their equivalents; or the chloride of barium may be mixed with the bark, &c., and then the tannin extracted, by leaching or otherwise, by any of the usual modes; or the chloride of barium may be combined with the tannin after it is extracted from the bark, or equivalent material. To this tanning liquor containing the chloride of barium is added sugar or its saccharoids, in which state the liquor is ready for the skins.

This compound is prepared in the manner substantially as herein described. In case the chloride of barium is first mixed with water, the amount used would be about one to one and a half per cent. of the chloride of barium to a certain quantity of water; but in case the chloride of barium is combined with the tannin extract, then the quantity of the chloride of barium should be in proportion to the strength of the liquid extract—that is, the said barium should be mixed with the tannin extract until all foreign matter and impurities in the liquid extract are precipitated. This may be determined by treating a small sample. The quantity of chloride of barium to be mixed or combined with the tannin liquid depends upon its strength and character. The proportion may be reached by taking a small but certain amount of the known mass of extract and treat it with chloride of barium until the result is reached. Then treat the whole quantity of the tannin extract by mixing with it an increased amount of the chloride of barium in the same relative proportions as used in the treatment of the small or sample test portion. When the tannin liquor is so prepared, there is then combined with it sugar, one pound; barium, one pound, dissolved together in warm water, which compound is mixed with about ten thousand pounds of the previously prepared liquor.

In place of sugar any of its saccharoids may be employed.

The compound thus prepared is then in condition for the skins and hides.

What I claim as my invention, and desire to secure by Letters Patent, is—

The herein-described compound for tanning skins and hides, consisting of either the chloride of barium, muriate of barytes or baryta, in combination with tannin, sugar, or its saccharoids, substantially as specified.

WALDEMAR THILMANY.

Witnesses:
W. H. BURRIDGE,
A. F. CORNELL.